United States Patent [19]
Thiele

[11] 3,802,539
[45] Apr. 9, 1974

[54] DISC BRAKE APPARATUS

[75] Inventor: Karl G. Thiele, Orlando, Fla.

[73] Assignee: Stamco, Inc., Orlando, Fla.

[22] Filed: Jan. 2, 1973

[21] Appl. No.: 320,442

[52] U.S. Cl. ........... 188/72.9, 192/70.24, 192/93 R, 192/99 A
[51] Int. Cl. ............................................ F16d 55/08
[58] Field of Search .............. 188/72.6, 72.9, 72.13; 192/70.24, 93 R, 99 A

[56] References Cited
UNITED STATES PATENTS

| | | | |
|---|---|---|---|
| 3,698,504 | 10/1972 | Harvey | 188/72.9 |
| 2,655,227 | 10/1953 | Eksergian | 188/72.9 X |
| 2,251,366 | 8/1941 | Miller et al. | 192/99 A X |
| 2,371,158 | 3/1945 | Eby | 188/72.9 |
| 2,830,679 | 4/1958 | Butler | 188/72.9 X |
| 2,830,681 | 4/1958 | Schilling | 188/72.9 X |
| 3,489,251 | 1/1970 | Swift | 188/72.6 |
| 3,664,469 | 5/1972 | Maurice | 188/72.9 |

*Primary Examiner*—George E. A. Halvosa
*Attorney, Agent, or Firm*—Duckworth, Hobby & Allen

[57] ABSTRACT

A vehicle brake apparatus for attachment to the axle of a vehicle having a rotatable disc attached so as to rotate with the wheel of a vehicle and a plurality of brake shoes with brake linings attached thereto are located on either side of the rotatable disc. The brake shoes are supported by a frame which is attached to the axle of a vehicle and are actuated by a plurality of camming levers which can drive the brake linings into frictional engagement with the rotatable disc. The camming surface on each lever drives one brake shoe while another camming surface on the same lever drives an arm which drives the opposite brake shoe lining into engagement with the rotatable disc. The arm is attached to the frame and spring biased to retract the brake shoe on the one side. The attachment of the arm to the frame is by adjustable bolts which allow for adjustment to the brakes and prevent rotation of the one brake shoe. The brake shoe includes torque lugs which engage a portion of the frame when the brake is actuated to prevent rotation thereof. The dual camming lever is not pinned in place and one surface has a roller to prevent the wedging of the lever in place when actuated. Pneumatic or hydraulic actuating means drive the levers for driving the brakes at a plurality of points.

8 Claims, 6 Drawing Figures

PATENTED APR 9 1974
3,802,539
Fig. 1.
Fig. 2.
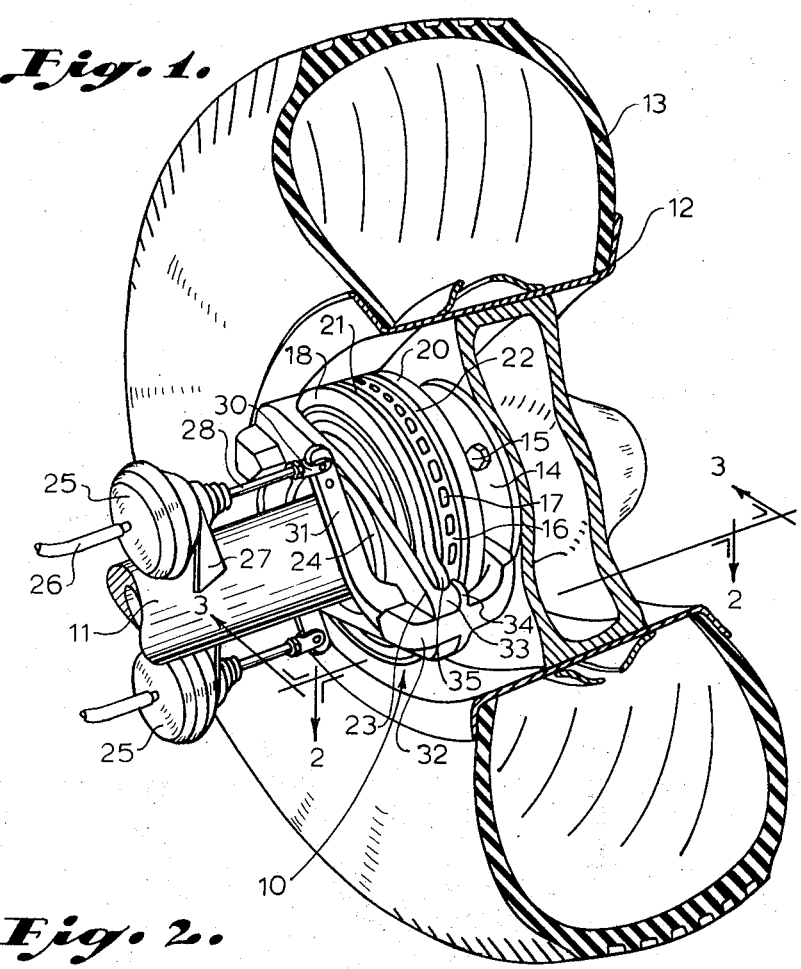
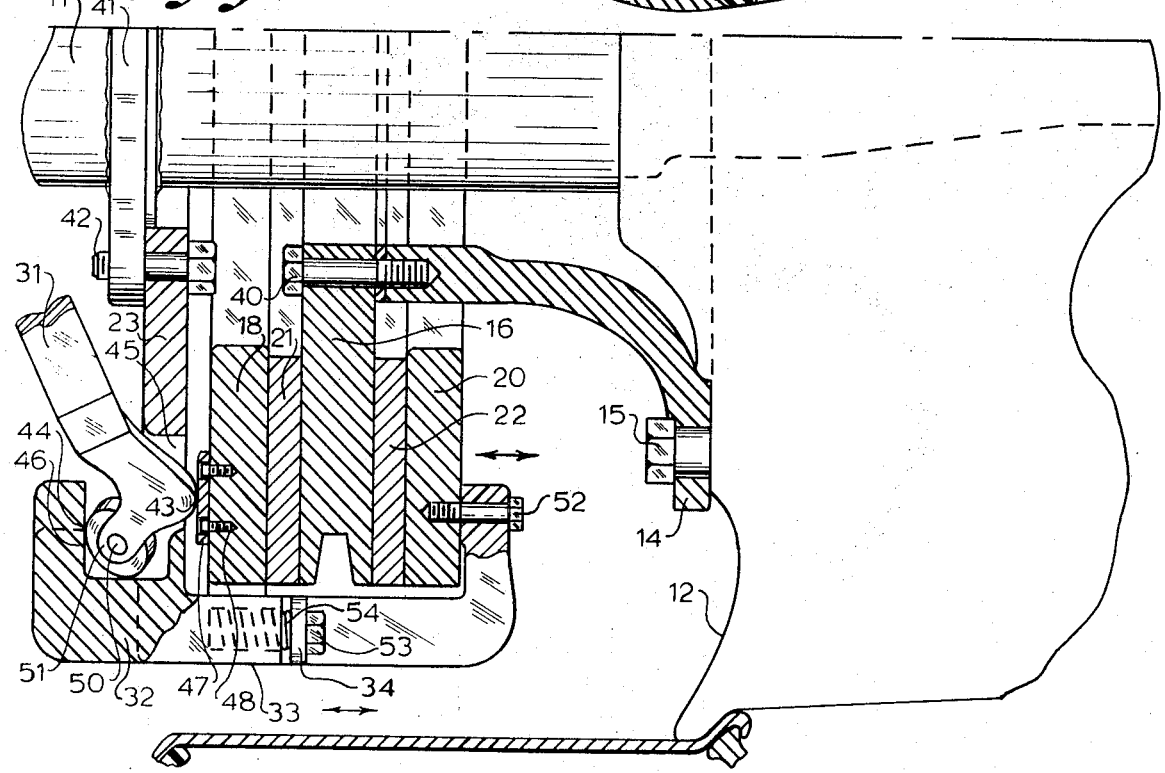

DISC BRAKE APPARATUS

BACKGROUND OF THE INVENTION

The present invention relates to vehicle brakes and more particularly to an improved vehicle brake assembly of the disc brake type.

In the past it has been common to have vehicles such as motor vehicles fitted with shoe type brakes which generally are internally expanding and hydraulically operated. However, in recent years disc type brakes have become increasingly more common because of the limitations of the shoe type brakes. Disc brakes have generally been of the partial disc type in which an annular brake disc is attached to the rotating wheel and is gripped by pincers having circular or kidney shape brake pads with friction linings to frictionally engage the disc to retard the rotation of the wheel. A large area of the disc has generally provided good results because of the good dissipation of the heat generated by the brake, thus improving the fade characteristics of the brakes. Another type of disc brake is referred to as the full disc or enclosed disc brake in which friction linings are attached to a shoe which may completely or partially encircle the axle parallel to the disc. In this type of disc brake the friction pads may be pressed against each side of the disc or alternatively can be pushing outward against the discs built into the brake housing, or the like To overcome the problems of chatter in partial disc brakes, some manufacturers have gone to what is known as a floating caliper disc brake which has a free-floating caliper to prevent the brake chatter. Many variations of these prior art brake devices have been taught, and these sometimes use different means for actuating the pincers on the opposite side of the brake shoe while simultaneously operating the pincer on the one side. U. S. patents showing these type of systems include U. S. Pat. No. 3,185,244, for a Disc Brake, U. S. Pat. No. 3,406,793 for a Parking Brake for a Disc Brake, U. S. Pat. No. 3,500,965 for a Disc Brake and Mounting therefor, U. S. Pat. No. 3,003,589 for a Vehicular Brake, U. S. Pat. No. 2,961,072 for a Disc Brake, U. S. Pat. No. 3,644,469 for Mechanically Operated Disc Brake, U. S. Pat. No. 3,154,175 for a Brake Shoe Restoring Device, U. S. Pat. No. 3,146,861 for an Automatic Adjusting Device, U. S. Pat. No. 2,959,253 for a Disc Brake, and finally, U. S. Pat. No. 2,371,158 teaches a Brake Mechanism in which a pair of levers are used to drive a full disc brake with one actuating mechanism. In these prior art patents, the caliper type disc brakes which are most closely associated with the present invention include lever actuation of one side of a brake shoe with a camming surface and then having some means of engaging the opposite brake shoe which is usually pinned to the lever so that it will pull the opposite direction to pull the other side brake shoe simultaneously for engaging both brake shoes against the rotating disc.

The present brake utilizes metallic linings to dissipate the heat through the brake linings and metal brake shoes, and may use a 360° lining if desired. Such systems are illustrated in U. S. Pat. No. 3,637,053 and U. S. Pat. No. 3,348,636, both directed towards a piston driven brake shoe.

SUMMARY OF THE INVENTION

A disc brake apparatus is provided for braking a vehicle wheel which has a rotatable disc which is fixedly attached to a wheel for rotation with the wheel. A brake shoe is located on either side of the rotatable disc and each brake shoe has a brake lining attached thereto for frictionally engaging said rotatable disc when driven against the rotatable disc. A spider frame is connected to the axle for supporting the disc brake apparatus and the brake is driven by a pair of dual camming levers actuated by a pneumatic or hydraulic actuating means. Each camming lever has two camming surfaces at one end thereof, one surface for camming the brake shoe located on the same side of the disc as the lever while the other camming surface is camming a saddle arm connected to the brake shoe on the opposite side of the disc for camming the arm in the opposite direction for simultaneous friction engagement of both brake linings with the disc. The saddle arms attached to the brake shoe are slidably attached to the frame and are spring loaded so that following actuation of the arm the springs will retract the arms to retract the brake shoe. The attachment of the saddle arms to the frame may be by adjustable bolts for adjusting the brakes as desired, and adjustable bolts may pass through the frame for maintaining the alignment of the brake shoe on the frame side of the brake. Torque lugs formed into the brake shoe on the frame side engage a portion of the frame for preventing the rotation of the brake shoe during operation.

BRIEF DESCRIPTION OF THE DRAWINGS

Other objects, features and advantages of this invention will be apparent from a study of the written description and the drawings in which:

FIG. 1 is a cutaway perspective view of a disc brake apparatus in accordance with the present invention, connected to an axle and wheel;

FIG. 2 is a sectional view taken along line 2—2 of FIG. 1;

DESCRIPTION OF THE PREFERRED EMBODIMENT

Figure 3:
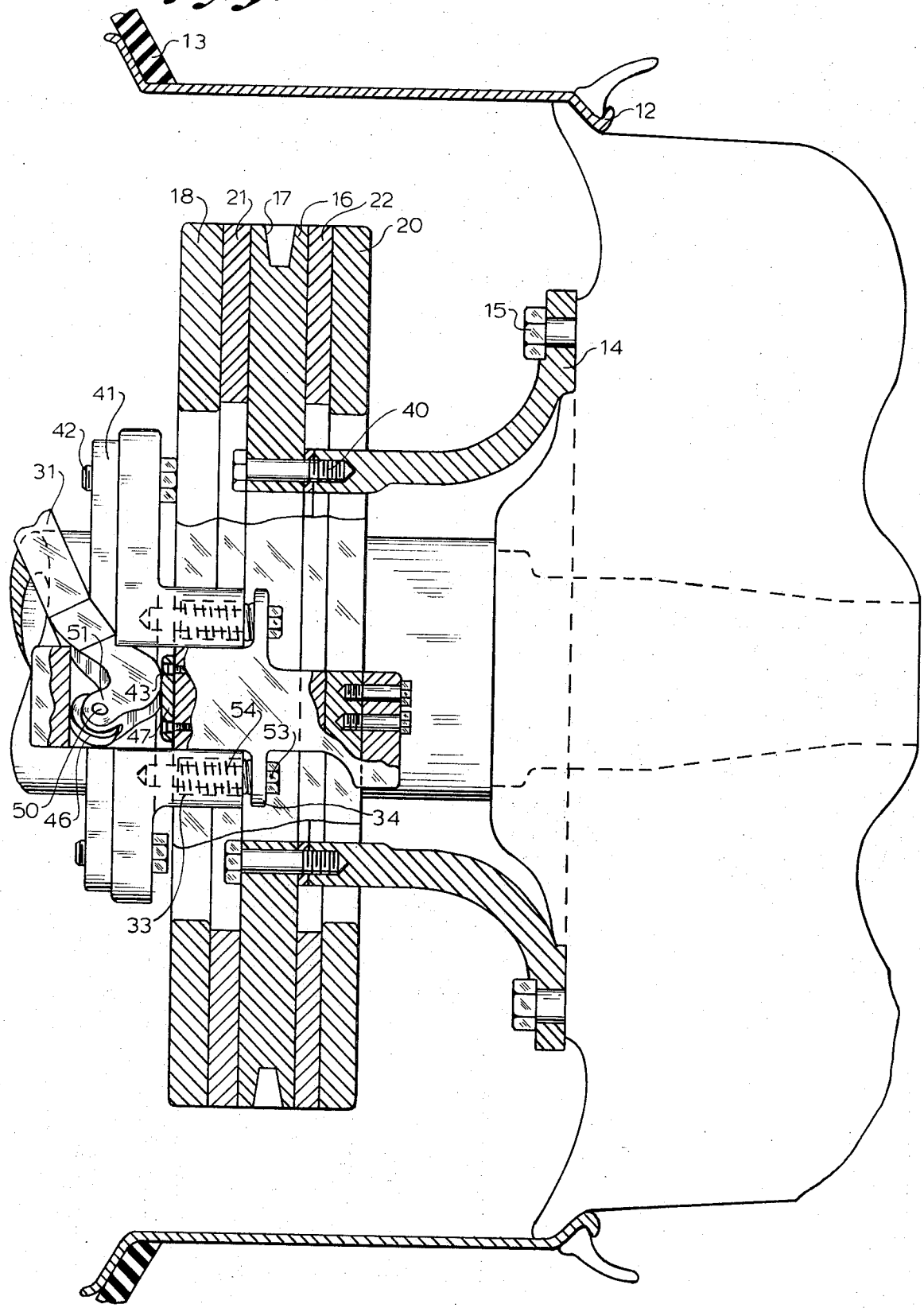
FIG. 3 is a sectional view taken along the line 3—3 of FIG. 1.

Referring now to FIG. 1 of the drawings, a disc brake apparatus 10 is attached to an axle 11 and has a wheel 12 with a tire 13 thereon attached to a rotatable flange adapter 14 of the brake apparatus 10 by bolts 15. The flange adapter 14 is fixedly attached to a rotating brake disc 16 for rotation therewith and disc 16 has slots or openings 17 to enhance the cooling of the disc during heavy operation. A pair of brake shoes 18 and 20 are located on either side of the rotatable disc 16 and have brake linings 21 and 22 attached thereto for frictionally engaging the rotating disc 16 when actuated for braking the disc and the attached flange adapter 14 and consequently the wheel 12 and tire 11. Brake apparatus 10 has a spider frame 23 which is attached at 24 to the axle 11. The brake 23 may be bolted to a flange on the axle or may be welded directly to the axle 11 as desired, but must rigidly hold the frame to the axle. A pair of pneumatic actuating units 25 are driven by air lines 26 and are attached by brackets 27 to the axle 11. These pneumatic actuating units drive rods 28 having a yoke 30 on the end thereof for engaging a pair of levers 31. Actuating the brakes in the cab of a truck or in an automobile drives the pneumatic cylinders 25 which drive the rods 28, yoke 30 and consequently a lever 31 which operates the brake unit 10, as will be described in more detail hereinafter. Generally the levers 31 are not connected except to the yoke 30 but ride between a saddle arm 32 connected to the brake shoe 20 so that camming the arm 32 will pull the brake shoe 20 and the lining 22 into engagement with the rotating disc 16. The other side of the camming surface of the lever 31 drives against the brake shoe 18 to drive that brake shoe and its lining 21 against the rotating disc 16. Since there are two levers 31, the units are driven from four points simultaneously. The spider frame 23 has a yoke 33 which the arm 32 rides in and to which the arm 32 is attached through the protruding tabs 34 by a set of bolts. Protruding torque lugs 35 are formed into the brake shoe 18 and engage the arms of the yoke 33 to prevent rotation of the brake shoe with the disc 16 when engaging the disc 16. Lugs 35 allow the brake shoe 18 to move in and out during actuation while preventing rotation of the brake shoe.

Referring now to FIGS. 2 and 3, a better understanding of the operation of the camming levers 31 is illustrated. Wheel 12 can be connected to the flange 14 by bolts 15 which are in turn bolted to the rotatable disc 16 by bolts 40 for rotation therewith while the axle 11 has a flange 41 welded thereto and has a spider frame 23 bolted thereto with bolts 42. The lever 31 can be seen to have first camming surface 43, camming roller 46 set in an opening 45 of the frame 23. Actuation of the lever drives the roller against a surface 44 of the saddle arm 32 while the opposite camming surface 43 simulataneously drives a pressure plate 47 attached with screws 48 to the brake shoe 18 for actuation of the brake shoe 18 and its associated lining 21 against the rotating disc 16. Roller 46 is pinned with a pin 50 to a yoke 51 which is neck of cam lever 31 and drives the arm 32 which is bolted with bolts 52 to the brake shoe 20 having its brake lining 22 attached thereto. Camming the arm 32 will pull the brake shoe 20 and brake lining 22 against the rotating disc 16 from the opposite side. However, the saddle arm 32 is attached by a pair of bolts 53 passing through the protruding tabs 34 through springs 54 to the yoke 33 of the spider frame 23. The arm 32 is prevented from rotating by being attached directly to the frame 23, as well as by the slide clearance of arm 32 in yoke 33. The bolts 53 are attached through springs 54 with a space therebetween, so that actuation of the arm 32 allows it to ride on the bolts 53 to compress the springs 54. This feature is especially important in that it allows adjustment of the brake shoe 20 by tightening or loosening the bolts 53 which determine how far the brake shoe will be retracted. The retraction of the brake shoe 20 is by means of the springs 54 which drives the arm 32 away from the frame yoke 33 and against the head of the bolt 53.

Figure 4:
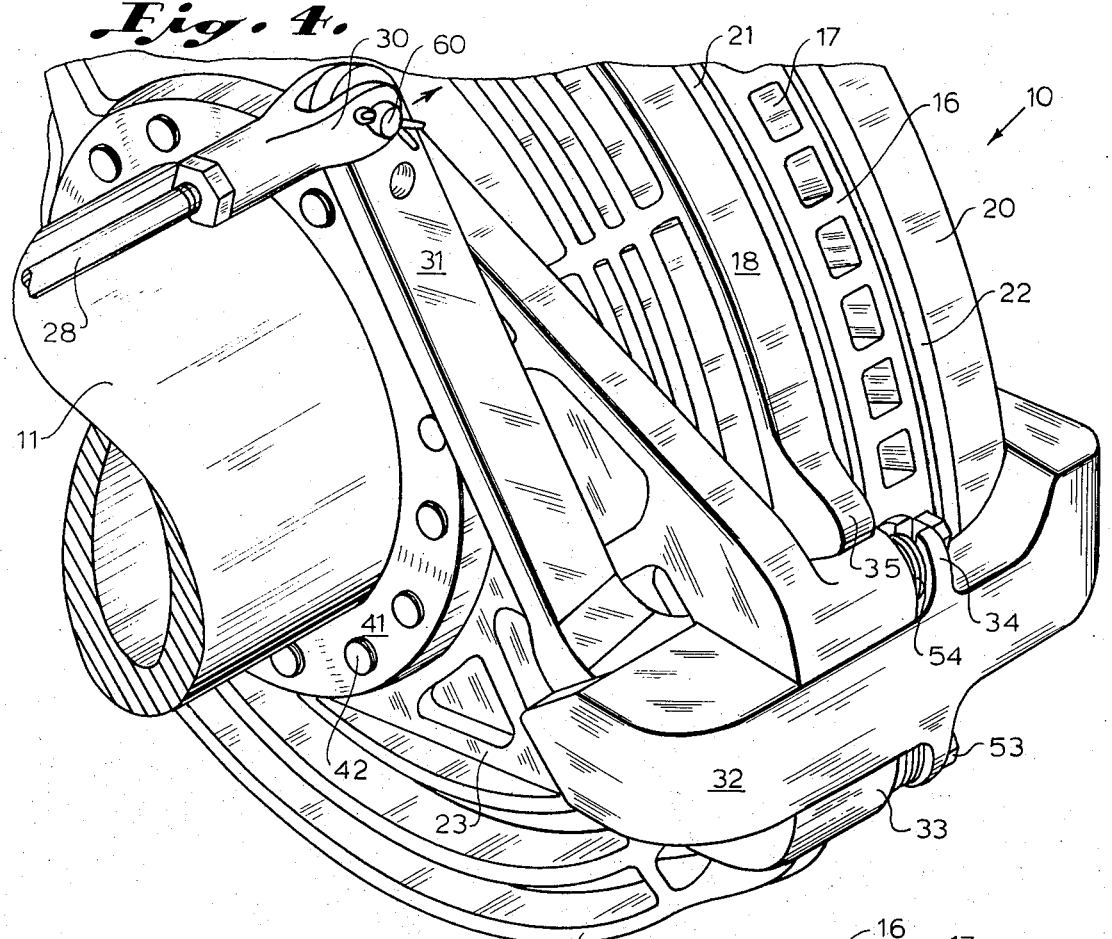
FIG. 4 is a perspective view of a portion of a disc brake apparatus in accordance with FIG. 1.
Figure 5:
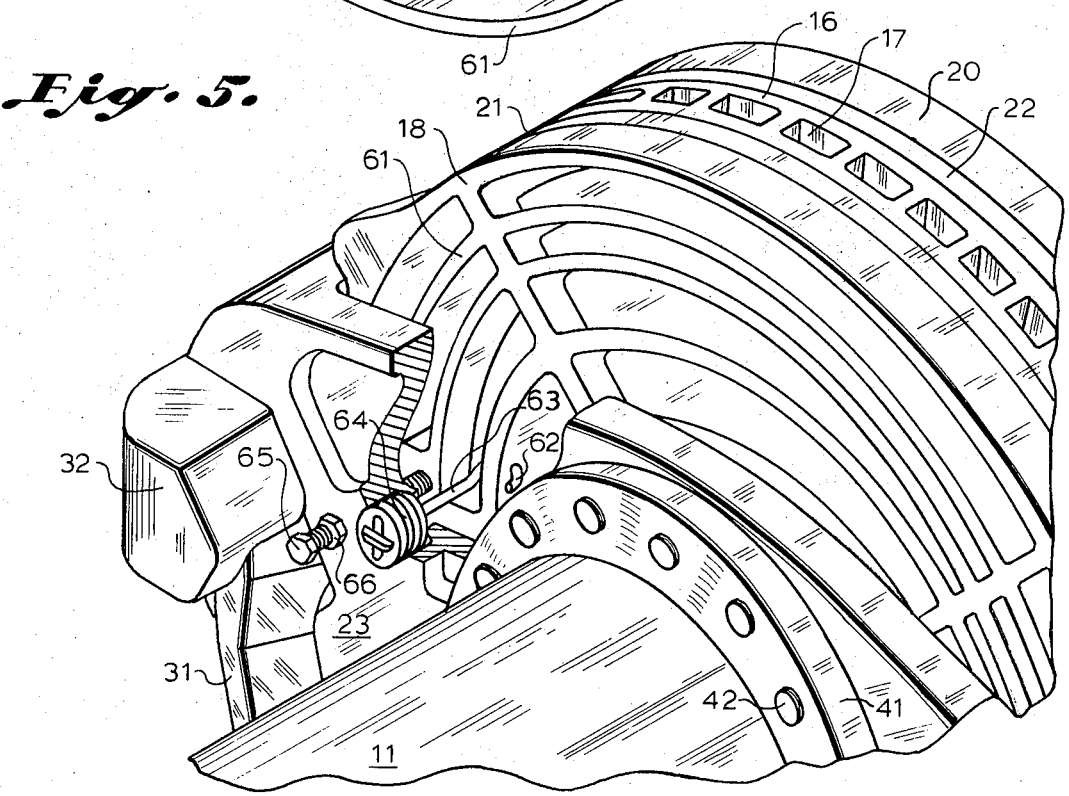
FIG. 5 is a perspective view of a portion of a disc brake in accordance with the embodiment of FIG. 1.

In FIGS. 4 and 5, the brake 10 attached to the axle 11 is illustrated separated from the wheel and attached to the flange 41 by bolts 42. The brake has brake shoes 18 and 20 having brake linings 21 and 22 attached thereto and located on either side of the rotatable brake disc 16 having slotted openings 17. An actuator arm is adjustably attached to a yoke or clevis 30 which is pinned by pin 60 to a lever arm 31 which lever arm sits in an opening in the spider frame 23 for driving the brake shoe 18 in one direction and the saddle arm 32 along with the brake shoe 20 in the opposite direction. Saddle arm 32 rides with yoke 33 and on a pair of bolts 53 which are threadedly attached to a yoke 33 of the spider frame 33 and are spring loaded with springs 54 compressing against the tabbed portions 34 so as to retract brake shoe 20 when the pressure from the lever 31 is removed from the saddle arm 32. Bolts 53 are adjusted to adjust the clearance of the brake shoe 20 and brake lining 22 from the rotatable disc 16 and also prevent rotation of the brake lining 22 and brake shoe 20. Torque lugs 35 ride on the edges of the yoke portion 33 of the spider frame and can slide with the brake shoe 18 while preventing its rotation when engaged in a braking operation. The brake shoes are also provided with fins 61 to enhance the cooling since the brake linings are metallic, and conducting hear therethrough as well as through the brake shoes 18 and 20. Brake shoe 18 has openings 62 in the fins 61 for threading a hook 63 which is in turn connected to a spring 64 on the other side of the frame 23 and is utilized to retract brake shoe 18 when the pressure from the lever 31 is removed. Thus the spring 64 is used to return brake shoe 18 while the springs 54 are used to retract the brake shoe 20. A bolt 65 is threaded through a nut 66 and through frame 23 and is driven against the brake shoe 18 as is a similar bolt on the opposite side of the brake (not illustrated), for maintaining the alignment of the brake shoe 18 in its retracted position, as well as controlling the distance of travel required once the brake is actuated.

Figure 6:
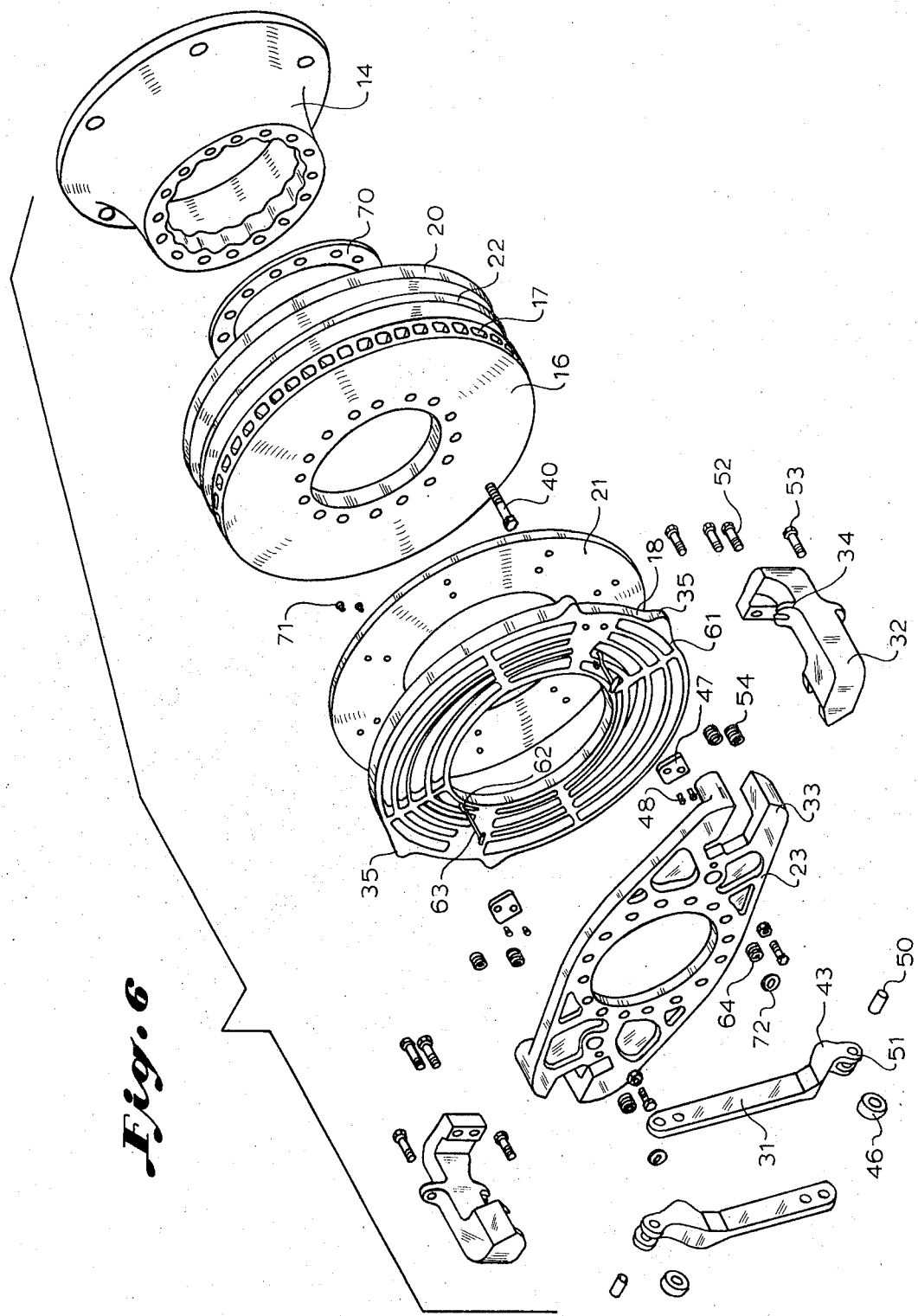
FIG. 6 is an exploded perspective view of a disc brake apparatus in accordance with the present invention.

FIG. 6 is an exploded view of an actual brake in accordance with the present invention and illustrates all of the working parts. Starting from the center, the brake has the rotatable disc 16 with slots 17 along with the bolts 40 which attach the wheel flange adapter 14 to the disc 16 and which may be provided with a spacer 70 for adjusting the position of a brake for different wheels. Brake shoe 20 has the brake lining 22 separated therefrom while brake shoe 18 has brake lining 21 separated therefrom. Brake linings may be held by rivets 71 or bolts, or may be attached with adhesive to the brake shoes. Brake shoe 18 has cooling fins 61 and has the spring arm and hook 63 attached to the opening 62 and has the torque lugs 35 for preventing rotation of the brake in operation. The separated saddle arm 32 has tabe 34 thereon and is held to the brake shoe 20 by the bolts 52 and to the frame 23 by the bolts 53 with the springs 54 therebetween. The pressure plate 47 is held to the brake shoe 18 by the screws 48 and provides a hard surface for the cam surface 43 to ride upon while driving the brake shoe 18. The opposite cam surface is in the form of a roller 46 which is pinned with a pin 50 in the clevis of a yoke on the lever 31 and prevents the free riding camming end from wedging or sticking in its seat. Brake shoe 18 is retracted by springs 64 held to the hook 63 by clips 72.

It should be clear at this point that a simplified disc brake apparatus has been provided which advantageously allows cooling through the 360° annular metallic brake lining and through finned brake shoes as well as through the rotatable disc. This disc brake advantageously provides dual camming levers which ride free at their driving end, not requiring a system for pinning and unpinning the lever for removal. The system also provides a frame cooperating with a torque lug to prevent rotation of one brake shoe and having a driving saddle arm for driving the opposite brake shoe simultaneously, which is connected to the brake shoe frame in a manner to prevent rotation of the other brake shoe and incorporating a retract for the other brake shoe. This invention is not, however, to be construed as limited to the particular forms disclosed herein since these are to be regarded as illustrative rather than restrictive.

I claim:

1. A disc means adapted to be fixedly attached to a wheel comprising in combination:
   a. a rotatable disc means adapted to be fixedly attached to a wheel for rotation therewith;
   b. a pair of brake shoes, one located on either side of said rotatable disc;
   c. brake lining means attached to each said brake shoe and adapted to frictionally engage said rotatable disc when driven thereagainst;
   d. a frame connectable to the axis of a vehicle for supporting said disc brake apparatus thereon;
   e. a plurality of camming levers each said camming lever having a pair of camming surfaces at one end thereof for camming one said brake shoe with one camming surface thereon;
   f. arms attached to said other brake shoe and adjustably connected to said frame member, said arms being engageable by said other camming surface of each camming lever for actuating said other brake shoe simultaneously with the actuation of said one brake shoe;
   g. actuating means attached to said levers at the other end thereof for actuation of said levers to drive said brake shoes towards said rotatable disc thereby driving said brake linings and to engage it with said rotatable disc; and
   h. said arms each being slideable between and engaged with only inner portions of yoke means formed in said frame member and said one brake shoe having torque lugs thereon slideably engaging only outer portions of said yoke means of said frame member to prevent rotation of said one brake shoe during engagement of the brake lining of said one brake shoe with said rotating disc said torque lugs being free to slide along said yoke means of said frame during actuation and retraction of said one brake shoe.

2. The apparatus in accordance with claim 1 in which arm attaching means slidably attach said arms to said frame, said attaching means being adjustable to vary the length of slide of said arms.

3. The apparatus in accordance with claim 2 in which said attaching means has spring biasing means for maintaining said arm in one position until actuated and for returning said arms to said one position following actuation of said disc brake apparatus.

4. The apparatus in accordance with claim 1 in which said camming lever pair of camming surfaces includes one roller surface for driving said arms.

5. The apparatus in accordance with claim 4 in which said one brake shoe includes an engaging surface attached thereto for said other camming surface to engage for driving said brake shoe during actuation of said disc brake apparatus.

6. The apparatus in accordance with claim 4 in which one said actuating means includes one pneumatic actuator driving a pair of camming levers.

7. The apparatus in accordance with claim 4 in which a pair of levers are driven by a separate actuating means for driving two different points from each said brake shoe.

8. The apparatus in accordance with claim 7 in which said brake shoes are annular finned metallic brake shoes surrounding said axle of a vehicle and said brake linings are 360° metallic brake linings attached to said brake shoes.

* * * * *